June 5, 1934.    J. J. KUHN    1,961,367
METHOD OF AND SYSTEM FOR TESTING MULTICHANNEL ELECTRICAL CIRCUITS
Filed April 12, 1933    2 Sheets-Sheet 1
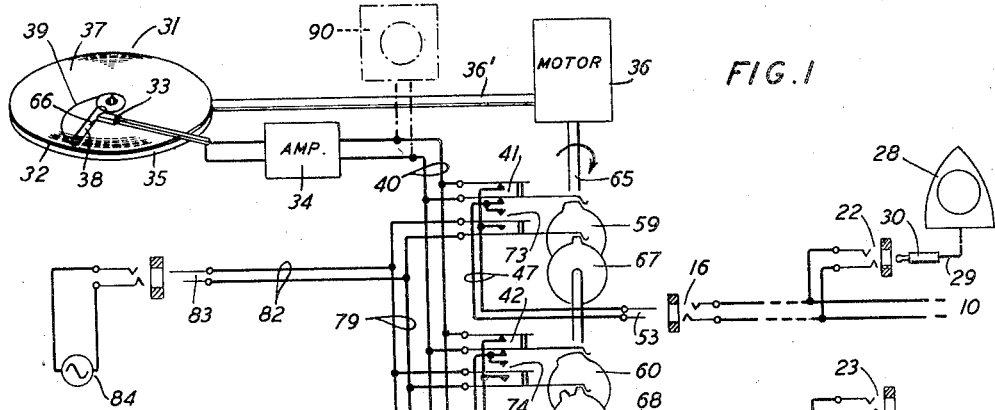
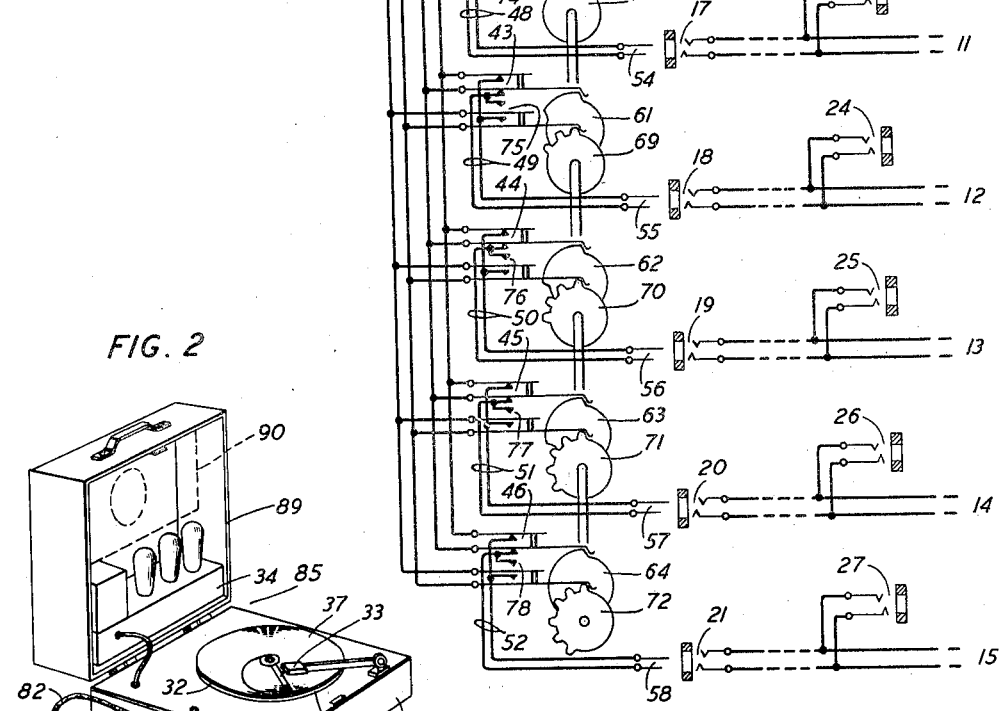
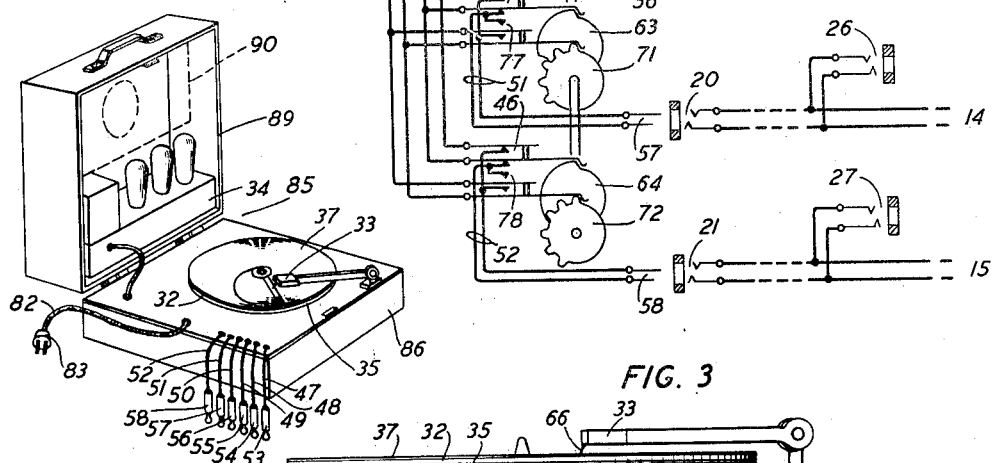
INVENTOR
J. J. KUHN
BY
Walter C. Kiesel
ATTORNEY June 5, 1934.   J. J. KUHN   1,961,367
METHOD OF AND SYSTEM FOR TESTING MULTICHANNEL ELECTRICAL CIRCUITS
Filed April 12, 1933   2 Sheets-Sheet 2
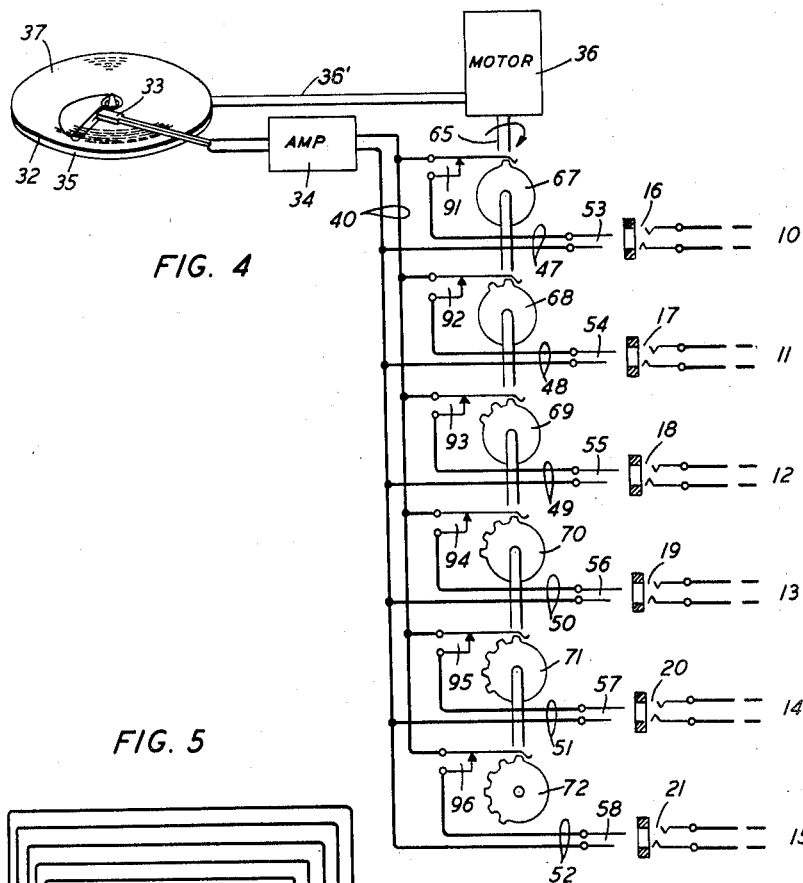
FIG. 4
FIG. 5
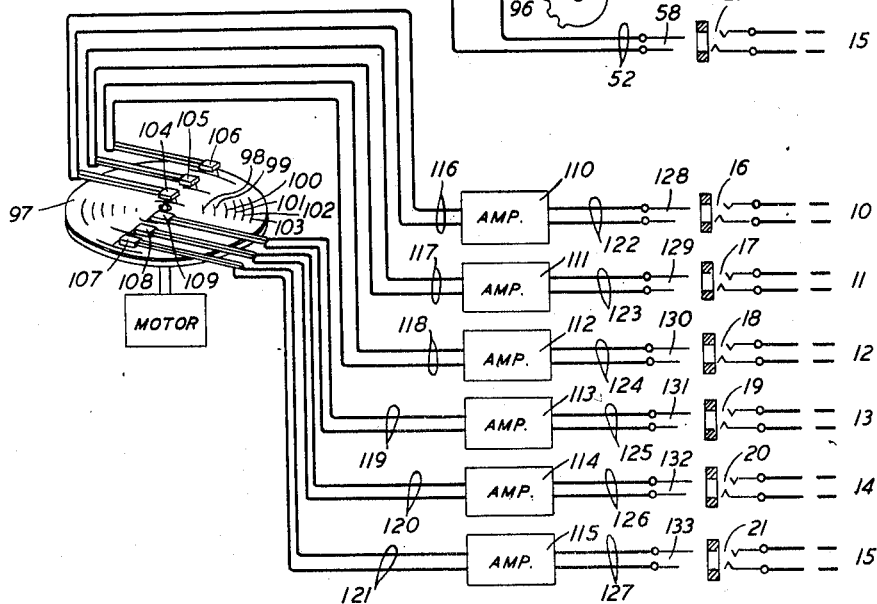
INVENTOR
J.J. KUHN
BY
Walter C. Kiesel
ATTORNEY

UNITED STATES PATENT OFFICE 1,961,367

METHOD OF AND SYSTEM FOR TESTING MULTICHANNEL ELECTRICAL CIRCUITS

John J. Kuhn, Elizabeth, N. J., assignor to Bell Telephone Laboratories, Incorporated, New York, N. Y., a corporation of New York Application April 12, 1933, Serial No. 665,677

15 Claims. (Cl. 179—175)

This invention relates to a method of and system for testing multi-channel electrical circuits.

More particularly, the invention relates to method and means for testing a plurality of electrical circuits or channels used in rado distribution or public address or program systems.

In program distribution systems, several channels are usually provided so that the listeners may have a choice of a number of programs at any given time. This is particularly true in hotels, apartment houses and the like, the control apparatus and program sources being concentrated at a central station or main control room, the several channels radiating from this station or room to outlets in the various parts of the area or rooms to be served. In an apartment house or hotel of several hundred or several thousand rooms, the wiring installation is complex and the number of outlets very large. After the installation is completed, it is necessary to test the various channels from the central station or control rooms to each outlet, and, to keep to a minimum the expense, time and labor involved, it is desirable that such testing means be portable and as nearly self-contained and simple as possible and that the method of testing be certain yet facile in operation. The testing, furthermore, should be under conditions as nearly as possible like those existing under actual program distribution conditions.

An object of this invention is to test each of the circuits or channels in a multi-channel distribution system so as to obtain a positive indication of correctness of wiring, open circuits, noisy connections and transmission loss, quickly, accurately, and with a minimum of testing equipment and operations.

One feature of this invention resides in a method of testing a plurality of electrical circuits which comprises impressing a preferably continuously repeated test program, selection or tone simultaneously on all of the circuits, and interrupting the program on each circuit at preassigned intervals to provide an identification of each circuit to a listener.

Another feature of the invention comprises a system of testing a plurality of electrical circuits, including a source of testing tone, program or selection to be impressed, preferably continuously and simultaneously, on the circuits, and means for interrupting the program at preassigned intervals to provide an identification for each circuit under test.

A further feature comprises the testing system described including a source of tone to be superimposed on the circuits during the interruptions in the test program to prevent a false signal resulting in the event of an interruption in the test program coincident with a pause in the test program, selection or tone.

A more complete understanding of this invention will be obtained from the detailed description which follows taken in conjunction with the appended drawings, wherein:

Fig. 1 is a schematic of one embodiment of this invention;

Fig. 2 is a perspective view of a portable structure embodying apparatus employed in utilizing the invention shown in Fig. 1;

Fig. 3 is a side elevation, enlarged and partly in section, of the cover member of the portable structure shown in Fig. 2;

Fig. 4 is a schematic of another embodiment of this invention; and

Fig. 5 is a schematic of still another embodiment of this invention.

There is shown in Fig. 1, a program distribution system comprising six channels 10, 11, 12, 13, 14 and 15. These channels may originate in a central station or main control room at the jacks 16, 17, 18, 19, 20, 21, respectively, each being adapted to be connected to the output terminals of an electrical program source, for instance, a phonograph and associated apparatus, a radio broadcast receiver, or a public address microphone and associated apparatus, by a plug insertable in the jack. The outlets 22 to 27 constitute the outlets in one of the many rooms which may be served by these channels, a loud speaker 28, or other sound wave reproducer, being connectable with the outlets in the ordinary manner, for instance, through a cord 29 and a plug 30, or through a suitable switch.

The testing system of this invention comprises a source of test program, selection or tone, designated generally by 31, consisting of a phonograph record 32 and an electrical pick-up or phonograph reproducer 33, the output of which is connected to the input terminals of an amplifier 34. The test program may comprise vocal or instrumental music, a speech record, or merely a single frequency tone. The turntable 35 is driven preferably continuously by a motor 36 through the shaft 36' and means are provided to enable continuous repetition of the test program. This means may comprise a disc 37, for instance, of celluloid, in the shape of a phonograph record and having a slot 38 whose length equals the width of the sound track on the record and extends thereacross, the disc having a spiral groove 39 on its upper surface connecting the ends of the slot. The disc is held in position by the phonograph reproducer while the record revolves until the end of the sound track on the record is reached at which point the needle 66 of the reproducer rides up into the groove 39 and the disc revolves with the record, the reproducer needle following the groove to the outer end of the slot and onto the record sound track near the periphery of the record.

The output of the amplifier 34 is impressed preferably simultaneously on the channels 10 to 15 through the conductors comprising the line 40, the normally closed contact spring sets 41 to 46, the conductors comprising the cords 47 to 52, and the plugs 53 to 58, which are adapted to engage with the jacks 16 to 21. The program so impressed may be detected by an observer or tester at the outlets in a particular room served by the program distribution system. By the use of the loud speaker 28, or other testing or observing instrument, observations may be made by the tester successively on each channel to determine whether the wiring is correct, whether there are open circuits, noisy connections, or more than the allowable transmission loss. To enable the tester to know which channel he is testing, continuously rotating cam members 59 to 64, mounted on a common shaft 65 and driven preferably by the motor 36, are provided to interrupt the test program on each channel or circuit for preassigned intervals by opening the normally closed contacts of the contact spring sets 41 to 46. For instance, the interval for channel 10 may be the time it would take for the tester or observer or listener at 22 to say "1", the interval for channel 11, the time it would take for him to say "1, 2", and similarly for each of the other channels, the interval for channel 15 being the time it would take the listener to say "1, 2, 3, 4, 5, 6".

In the event that a particular circuit is interrupted coincident with a pause in the test program, for instance, while the reproducer 33 is being returned by the automatic reset device 37 to the starting point of the sound track on the record 32, a false signal to the observer may result. To prevent such a contingency, there is provided means for impressing an auxiliary tone or signal on each channel or circuit during the interval when the test program is interrupted. This means comprises continuously rotating cam members 67 to 72, which are mounted preferably on the shaft 65, being arranged to close for preassigned intervals the normally open contacts of the contact spring sets 73 to 78 to connect the conductors comprising the line 79 with the cords 47 to 52. The conductors comprising the line 79 are connected through the conductors comprising cord 82, and the plug 83 with a source 84 of auxiliary tone, preferably, a single frequency tone, which may comprise the ordinary 25 cycle or 60 cycle alternating current. It will be apparent that during the intervals that the contact spring sets 41 to 46 are open, there will be impressed on the channels or circuits 10 to 15, 1, 2, 3, 4, 5 and 6 pulses, respectively, of the auxiliary signal tone providing a positive identification of the circuit to be observed.

It is apparent, of course, that the test program may be impressed continuously and non-interruptedly on one channel and that the auxiliary tone need not be impressed thereon. For instance, if channel 10 were so treated, there would be no need for cams 59 and 67 and contact spring sets 41 and 73, the conductors of the cord 47 being connected directly to the line 40.

Figs. 2 and 3 illustrate how the apparatus employed in the testing system of this invention may be housed in a readily portable container or case designated generally by 85, having a hollow removable cover portion 86. The cover houses the motor 36; the gearing 87 required to enable the turntable 35 and the cam carrying shaft 65 to be driven simultaneously and by the single motor 36; the circuit controlling cam members 59 to 64 and 67 to 72; and the contact spring sets 41 to 46 and 73 to 78, supported on a suitable rack member 88. The body portion 89 of the case contains the amplifier 34 and, if it is desired to monitor the test program, a loud speaker 90 may be mounted therein.

A modification of this invention is shown in Fig. 4. In this embodiment, the cam members 67 to 72 only are provided and when driven by the motor 36 interrupt the test program which is simultaneously impressed on the channels or circuits 10 to 15 through the line 40, the normally closed contact spring sets 91 to 96, the cords 47 to 52, and the plugs 53 to 58. It is apparent that the observer will be able to identify the respective circuits by noting the number of interruptions in the program. The test program will be interrupted for one short interval on channel 10, for two successive short intervals on channel 11,—and for six successive short intervals on channel cord circuit 15.

In the modification of the invention shown in Fig. 5, the source of the test program comprises a phonograph record 97 having as many separate and different selections thereon as there are channels or circuits to be tested. Six circuits, 10 to 15, being employed, six selections, 98 to 103, are provided and are recorded, preferably, in single, endless grooves. Reproducers 104 to 109, each associated with one groove, are connected to the inputs of the amplifiers 110 to 115 through the conductors comprising the lines 116 to 121. The outputs of these amplifiers may be impressed on the cricuits to be tested through the conductors comprising the cords 122 to 127, and the plugs 128 to 133, which are insertable in the jacks 16 to 21. The test program and identifying selections 98 to 103 may comprise the repetition for instance, of the numerals 1, 2, 3, 4, 5 and 6, respectively.

While the features of this invention have been disclosed in various specific embodiments, it is understood, of course, that various modifications may be made in the details thereof without departing from the scope of the invention as defined in the appended claims.

What is claimed is:

1. A system for testing a plurality of electrical circuits, comprising a source of testing tone, means to impress said tone simultaneously on said circuits, and means individual to each circuit for interrupting the testing tone on each of said circuits to provide an identification for each of said circuits.

2. A system for testing a plurality of electrical circuits, comprising a source of testing tone to be impressed simultaneously on said circuits, and means for interrupting the testing tone on some of said circuits to provide an identification for said circuits.

3. A system for testing a plurality of circuits, comprising a source of test tone to be impressed on said circuits, means for automatically repeating said test tone, and means for interrupting the testing tone at preassigned intervals to provide an identification of the circuits under test.

4. A system for testing a plurality of electrical circuits, comprising a source of testing tone to be impressed on said circuits, means for interrupting said test tone at preassigned intervals to provide an identification for each of the circuits under test, and a source of tone to be superimposed on the circuits during the interruptions in the testing tone to prevent a false signal resulting in the event of an interruption simultaneously with a pause in the testing tone.

5. A system for testing a plurality of electrical circuits, comprising a source of testing tone to be impressed simultaneously on said circuits, means connecting said source of testing tone to said circuits, and means for automatically removing the testing tone from a particular circuit at preassigned intervals.

6. A system for testing a plurality of electrical circuits, comprising a source of testing tone to be impressed simultaneously on said circuits, means connecting said source of testing tone to said circuits, means for removing the testing tone from a particular circuit at preassigned intervals, and means for impressing an auxiliary tone on said circuit during such intervals.

7. A system of testing a plurality of electrical circuits, comprising a source of testing tone to be impressed on said circuits, means connecting said source of testing tone with said circuits, means for removing the testing tone from said circuits, and means for impressing an auxiliary tone on said circuits when the testing tone is removed.

8. The method of testing a plurality of electrical circuits, which comprises impressing a test program on said circuits, listening in on each of said circuits, and interrupting the test program on some of said circuits at preassigned intervals to provide an identification of each circuit to the listener.

9. The method of testing a plurality of electrical circuits, which comprises impressing a test program on said circuits, listening in on each of said circuits successively, and interrupting the program on each circuit at preassigned intervals to provide an identification of each circuit to the listener.

10. The method of testing a plurality of electrical circuits, which comprises impressing a test program simultaneously on all of said circuits, listening in on each of said circuits successively, and interrupting the program on each circuit at preassigned intervals to provide an identification of each circuit to the listener.

11. The method of testing a plurality of electrical circuits, which comprises impressing a continuously repeated test program simultaneously on all of said circuits, listening in on each of said circuits successively, and interrupting the program on each circuit at preassigned intervals to provide an identification of each circuit to the listener.

12. The method of testing a plurality of electrical circuits, which comprises impressing a test program on said circuits, interrupting the program on a circuit at preassigned intervals to provide an identification for said circuit to one listening thereon, and impressing on said circuit during the interruption an auxiliary tone.

13. The method of testing a plurality of electrical circuits, which comprises impressing a test program on said circuits, interrupting the program on each circuit at preassigned intervals to provide an identification for said circuit to one listening in thereon, and impressing on each circuit during the interruption an auxiliary tone.

14. The method of testing a plurality of electrical circuits, which comprises impressing a test program simultaneously on all of said circuits, interrupting the program on each circuit at preassigned intervals to provide an identification for said circuit to one listening in thereon, and impressing on each circuit during the interruption an auxiliary test program.

15. The method of testing a plurality of electrical circuits, which comprises impressing a test program simultaneously on all of said circuits, listening in on each of said circuits successively, interrupting the program on each circuit at preassigned intervals to provide an identification to the listener for said circuit, and impressing on each circuit during the interruption in the program an auxiliary test program to prevent a false signal to the listener in the event of a pause in the test program and the particular circuit occur coincidentally.

JOHN J. KUHN.